(12) United States Patent
Isogawa et al.

(10) Patent No.: US 7,294,069 B2
(45) Date of Patent: Nov. 13, 2007

(54) GOLF BALL

(75) Inventors: Kazuhiko Isogawa, Kobe (JP); Koichi Fujisawa, Kobe (JP); Yoshikazu Yabuki, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 11/157,825

(22) Filed: Jun. 22, 2005

(65) Prior Publication Data

US 2006/0009308 A1    Jan. 12, 2006

(30) Foreign Application Priority Data

Jul. 9, 2004 (JP) ............................. 2004-203931

(51) Int. Cl.
*A63B 37/12* (2006.01)

(52) U.S. Cl. ..................................... 473/378

(58) Field of Classification Search ................ 473/351, 473/377, 378
See application file for complete search history.

(56) References Cited

U.S. PATENT DOCUMENTS 5,935,021 A    8/1999    Kashiwagi et al.
6,610,772 B1 *  8/2003   Clauberg et al. ............. 524/445
2002/0045501 A1  4/2002  Takemura et al.
2003/0130061 A1 * 7/2003  Rajagopalan et al. ....... 473/354
2004/0092336 A1 * 5/2004  Kim et al. ................... 473/367
2005/0288446 A1 * 12/2005 Zieske et al. ............. 525/330.2
2006/0128505 A1 * 6/2006  Sullivan et al. ............. 473/371

FOREIGN PATENT DOCUMENTS

| JP | 10-137365 A | 5/1998 |
| JP | 2002-136618 A | 5/2002 |
| JP | 2004-504900 | 2/2004 |
| WO | WO-02/09823 A1 | 2/2002 |

* cited by examiner

*Primary Examiner*—Raeann Trimiew
(74) *Attorney, Agent, or Firm*—Birch, Stewart, Kolasch & Birch, LLP

(57) ABSTRACT

The present invention provides a golf ball which provides a longer ball distance and excellent abrasion resistance while maintaining a soft shot feeling. The golf ball includes a core, and an outer layer wrapping the core, wherein the outer layer is made of a resin composition containing cation-treated phillosilicate. In particular, by use of a resin composition containing the cation-treated phillosilicate for a cover layer, the resultant golf ball exhibits excellent flight performance and abrasion resistance.

18 Claims, No Drawings

GOLF BALL

BACKGROUND OF THE INVENTION

1. Field of the Invention

The present invention relates to a golf ball excellent in abrasion resistance, and more specifically, relates to an improvement in a resin composition to be used for an outer layer of a golf ball.

2. Description of the Related Art

As a base resin used in an outer layer for covering a core of a golf ball, such as a cover layer or an intermediate layer, ionomer resin and polyurethane are used. A thread-wound core or a vulcanized rubber-molded core is wrapped with a resin composition including these resins as a main component.

In the above structure, a cover layer made of ionomer resin as a base resin is widely used due to its excellent resilience and processing characteristics. However, the problems of this kind of the cover layer are pointed out that, because of its high stiffness and hardness, it provides poor shot feeling, insufficient spin performance, and poor controllability.

On the other hand, polyurethane is used as a base resin for constituting a cover layer, because the polyurethane provides improved shot feeling and spin performance as compared with ionomer resin. However, it cannot be said that the cover layer made of polyurethane provides resilience and abrasion resistance enhanced to satisfactory levels. In addition, when polyurethane is used, the golf ball becomes soft. Such golf ball spins much and decrease a launch angle, resulting in a short ball distance.

In an attempt to solve the problems described above, it has been proposed to include fibrous aluminum borate whisker or organic short fiber in the cover layer (Japanese Laid-Open Patent Publication No. 10-137365 and Japanese Laid-Open Patent Publication No. 2002-136618). However, these fibrous substances have small specific surface areas. For this reason, although the fibrous substances are easily dispersed, the large-sized reinforcing materials come to scatter over the resin. When dispersed in the matrix of the resin, the reinforcing materials have small reinforcing effect. Therefore, in order to satisfy a desired mechanical property, it is required to blend a large amount of reinforcing materials. As a result, the resin content in the resin composition becomes low. In this case, there are problems that resilience which is an important property as a golf ball is not obtained and abrasion resistance becomes low because of insufficient dispersion of the reinforcing material.

Further, it has also been proposed to add nanocomposite material such as hydrotalcite or octosilicate as a reinforcing material other than those described above into a resin composition (Japanese National Publication No. 2004-504900). Since the fillers of these types are formed into nano-sized fine particles, it is hard to be dispersed into resins. In particular, such fillers are difficult to be dispersed as particles into hydrophobic resins to be used in forming a cover layer such as ionomer resin and polyurethane. As a result, agglomerated particles are unevenly located in the resin matrix, as is the case of the reinforcing material with a large diameter described above. Therefore, even if these reinforcing materials are used, neither the hardness of desired level nor the desired abrasion resistance is obtained.

SUMMARY OF THE INVENTION

It is an object of the present invention to provide a golf ball which achieves a long ball distance and has excellent abrasion resistance in its resin composition to be used for an outer layer.

The golf ball of the present invention comprises a core and an outer layer for covering the core, and the outer layer is formed of a resin composition containing a cation-treated phillosilicate. Since the outer layer is made of a resin composition containing the cation-treated phillosilicate, the cation-treated phillosilicate is satisfactorily dispersed in the resin matrix. As a result, the cation-treated phillosilicate can sufficiently express its property as the fine particles.

DESCRIPTION OF THE PREFERRED EMBODIMENTS

Hereinafter, the present invention will be described in detail.

A phillosilicate of the present invention is, for example, silicate having a structure of $[(Si_2O_5)^{2-}]_n$, and specific examples thereof include: mica such as white mica and black mica that are generally referred to as clay minerals; clays such as bentonite containing smectite, kaolinite, and montmorillonite as main components; talc; and chlorite. Among them, bentonite is preferable because it easily turns into fine particles in the form of single leaf, and the most preferable is montmorillonite obtained by purifying bentonite.

The phillosilicate described above is in the form of nano-sized fine particles of which primary particles has a thickness of 10 nm or smaller, and each of which shape is like a flat plate having a length and a width of 1 μm or smaller respectively. Due to this structure and the size, the phillosilicate in the form of very fine particles has advantages that it exhibits sufficient effect as a reinforcing material when satisfactorily dispersed into a resin, and that only a small use amount thereof is required. Therefore, if the phillosilicate in the form of fine particles can be uniformly dispersed into a resin, even though the phillosilicate is added to a soft resin such as polyurethane, its property as a resin is less impaired. The size of a primary particle of the phillosilicate is not specifically limited as far as it is 1 μm or smaller, and preferably, the size thereof is 700 nm or smaller, and more preferably 500 nm or smaller, and 10 nm or higher, and more preferably 50 nm or higher. Further, the primary particle of the phillosilicate in the form of single leaf exhibits its sufficient effect as far as its thickness is 10 nm or smaller. In order to establish the dispersion state of the primary particle in the form of the single leaf in the resin matrix, however, it is preferable that the phillosilicate has a thickness of 0.1 nm or more, and more preferably has a thickness ranging between 0.5 nm or larger and 5.0 nm or smaller.

In general, the phillosilicate described above is present in a state in which the particles aggregate with each other by an electrostatic force and van der Waals force to form secondary particles. Since an untreated phillosilicate has by nature high hydrophilic property in the form of particles alone, it has very excellent dispersibility into water and immediately swells in an aqueous solution. However, when a reinforcing material is mixed with a resin for a golf ball to produce a resin composition for an outer layer, the reinforcing material is required to be fully blended with ionomer resin or polyurethane for example. In this case, there arises a problem that the untreated phillosilicate is not dispersed sufficiently.

To solve such a problem, in the present invention, a cation-treated phillosilicate is used in order to achieve a state in which the cation-treated phillosilicate is dispersed to near primary particles in the form of single leaf into a resin matrix.

Although it is unclear why the affinity with the resin is improved by performing the cation treatment to the phillosilicate, the reason is imagined as follows. Specifically, the phillosilicate having by nature high hydrophilic property turns into that having lipophilic property by the cation located on the surface thereof. It is imagined that the cation treatment enhances the affinity of the phillosilicate with a resin. In particular, the cation-treated phillosilicate can be satisfactorily dispersed even when used together with a resin having high hydrophobic property, thereby producing a resin composition in which the cation-treated phillosilicate is uniformly dispersed in the resin matrix.

Then, if a cover layer is formed of thus-prepared resin composition for example, the resultant cover layer has an improved elasticity modulus and also has high anisotropy that is achieved by changing the balance between the elasticity modulus in a compressing direction and the elasticity modulus in a stretching direction. Specifically, the elasticity modulus in a compressing direction becomes higher in the cover layer as compared with the case where a cover layer is made of resin alone, so that resilience force can be enhanced. Further, an increasing amount in the elasticity modulus in a stretching direction becomes larger than that in a compressing direction. For this reason, the cover layer formed of the resin composition of the present invention exhibits higher anisotropy in the balance between the elasticity modulus in a stretching direction and the elasticity modulus in a compressing direction. As a result, the resultant cover layer quickly recovers from the deformation when hit, thereby suppressing spin rate and increasing a ball distance.

It is unclear why the balance between the elasticity modulus in the compressing direction and the elasticity modulus in the stretching direction changes. However, it is imagined as follows. Since the cation-treated phillosilicate of the present invention is dispersed to near primary particles in the form of flat plate like single leaf, it is likely to align in parallel to a circumferential direction of a ball along the flowing direction of the resin composition in a molding step. Therefore, in the thickness direction of the outer layer, the elasticity modulus in the compressing direction increases to be higher than that of the case where the resin composition is composed of a resin alone, whereas an increasing amount of the elasticity modulus in the compressing direction is suppressed to be lower than an increasing amount of the elasticity modulus in the stretching direction. For this reason, it is assumed that the nature of high hardness of the cation-treated phillosilicate appears in the stretching direction and the nature of the softness of the resin appears in the compressing direction.

Further, since the cation-treated phillosilicate is uniformly dispersed, high elasticity modulus is achieved in the stretching direction even if the resin composition contains a soft resin as a resin component. Such a resin composition can form an outer layer excellent in abrasion resistance while providing a soft shot feeling. In particular, when a polar resin such as polyurethane is used in order to provide a soft shot feeling, a dispersion of an untreated phillosilicate into the resin is likely to be insufficient because the untreated phillosilicate is by nature hydrophilic. However, the cation-treated phillosilicate of the present invention is advantageous in that it satisfactorily disperses even in such a polar resin.

Examples of the cation to be used for the cation-treated phillosilicate of the present invention include those that give the phillosilicate affinity with a resin. Metallic cations, for examples, alkaline metals such as sodium ion and potassium ion, or alkaline earth metals such as calcium ion and barium ion may be used. However, especially preferable is quaternary ammonium salt.

It is preferable that the quaternary ammonium salt has substituent groups at least one of which is selected from the group consisting of an aromatic hydrocarbon group and a carboxylic group, and more preferable is quaternary ammonium salt which has both of these substituent groups. The use of quaternary ammonium salt having these substituent groups imparts a high polarity to phillosilicate so that the cation-treated phillosilicate easily disperses in the polar resin.

Examples of the aromatic hydrocarbon group include benzyl group, phenethyl group, tolyl group, xylyl group, diphenylmethyl group, and trityl group, which are benzenes or derivatives of benzenes. Among them, benzyl group is preferable.

Further, the carboxylic group may be either aromatic or aliphatic. Examples of the preferable carboxylic group include, for example, carboxylate group such as stearate group, myristate group, palmitate group, oleate group, and laurate group. Examples of proper carboxylic group which are commercially available in the market include fats and oils group such as beef tallow fatty acid group.

Preferable examples of other substituent groups of the quaternary ammonium salt include saturated or unsaturated straight-chain or branched aliphatic hydrocarbon group having a carbon number of 1 to 4 carbons, which, for example, alkyl group such as methyl group, ethyl group, propyl group, butyl group, and isopropyl group. The substituent groups may have double bonds as unsaturated aliphatic hydrocarbon group has. Further, substituent groups may be in a heterocyclic ring structure in which two or more substituent groups forms a ring.

The method for performing the cation treatment to the phillosilicate is not specifically limited. Preferable examples thereof include a method in which the phillosilicate is cation-treated before mixed with a resin. Although the phillosilicate may be cation-treated at the time when a resin composition is prepared, it is preferable that the phillosilicate is cation-treated before mixed with a resin. If the phillosilicate is subjected to cation treatment beforehand, the particles thereof are entirely cation-treated uniformly and disperse in a short time when mixed with a resin. Therefore, it is preferable that the entire surfaces of the particles of the phillosilicate are completely cation-treated. However, it is also possible to make proper changes taking into consideration the dispersibility into the resin to be used.

Examples of the cation-treated phillosilicate described above include: Dellite (trade name) 43B (purified montmorillonite, including particles with 500 nm in diameter and 1 nm in thickness, treated with quaternary ammonium salt: quaternary ammonium salt having benzyl group, beef tallow fatty acid group and two methyl groups); Dellite (trade name) 67G (purified montmorillonite, including particles with 500 nm in diameter and 1 nm in thickness, treated with quaternary ammonium salt: quaternary ammonium salt having two beef tallow fatty acid groups and two methyl groups); and Dellite (trade name) HPS (purified montmorillonite, including particles with 500 nm in diameter and 1 nm in thickness, treated with Na cation), all of which are manufactured by Laviosa Chimica Mineraria S.p.A. Such cation-treated phillosilicate is in the form of secondary particles of about several microns due to aggregation before dispersed into a resin. However, since the cation-treated phillosilicate has affinity with a resin, such cation-treated phillosilicate can be dispersed to near primary particles in the form of single leaf into a resin matrix. Therefore, the cation-treated phillosilicate of the present invention is also excellent in handling at the time of preparing a resin composition.

Next, a method for manufacturing a golf ball by use of the resin composition of the present invention in the cover layer for the outer layer will be described. As will be described later, the resin composition may be also used in an intermediate layer in a multi-piece golf ball.

A cover layer of the golf ball of the present invention is formed by molding a resin composition for a cover layer containing a resin component as a base material and cation-treated phillosilicate. The amount of the theory of cation-treated phillosilicate into the resin composition for a cover layer is not specifically limited, and preferably 1 part by mass or more, and more preferably 2 parts by mass or more, and still more preferably 3 parts by mass or more, and 30 parts by mass or less, and more preferably 20 parts by mass or less, and still more preferably 10 parts by mass or more, with respect to 100 parts by mass of the resin component. After being dispersed, the cation-treated phillosilicate of the present invention is present in a resin matrix as fine particles in the form of single leaf. Therefore, improvement in the cover layer can be achieved even if the amount of the cation-treated phillosilicate is small with respect to the resin component as described above.

The resin component of the resin composition for a cover layer is not specifically limited, and examples thereof include polyurethane, ionomer resin, polyamide, polyester, polyolefin, polystyrene-based elastomers, and mixtures thereof. It is particularly preferable to select polyurethane or ionomer resin as the main component of the resin component. The content of the polyurethane or ionomer resin in the resin component is 50 mass % or more, and more preferably 70 mass % or more, and still more preferably 90 mass % or more. It is also preferable that the resin component consists essentially of polyurethane or ionomer resin. Employment of polyurethane or a mixture of polyurethane and other resins as a base resin component of a resin composition for a cover layer makes it possible to form a soft cover layer which provides a soft shot feeling. Further, containment of the cation-treated phillosilicate of the present invention makes it possible to improve the balance of elasticity modulus of the cover layer while maintaining the soft shot feeling that polyurethane provides, and as a result, a longer ball distance is also achieved.

It is preferable that the cover layer made of the resin composition containing the cation-treated phillosilicate of the present invention provides high anisotropy to the balance between the compressing direction (i.e. a diameter direction of the ball) and the stretching direction (i.e. a circumferential direction of the ball) when hit. The increased anisotropy suppresses the spin rate of the ball, achieves a high launch angle, and increases a ball distance. Specifically, if the cover layer is made of resin component alone, it is hard to achieve a high ratio between the elasticity modulus in the compressing direction and the elasticity modulus in the stretching direction. The same disadvantage arises even in the case of using a resin composition including a reinforcing material in the spherical shape or isotropic shape such as cubic added thereto. Although the addition of such a reinforcing material increases the elasticity moduli in the respective directions, the contributions of elasticity moduli to the respective directions are almost the same each other. Thus, the change in the balance between the elasticity modulus in the compressing direction and the elasticity modulus in the stretching direction is small.

Contrary to the above, in the present invention, the cation-treated phillosilicate which can be dispersed in the resin in the form of single leaf is used. Due to the particle shape of the cation-treated phillosilicate, although no remarkable increase in the elasticity modulus is produced in the compressing direction of the ball as compared with the case of using a resin alone, a large increase in the elasticity modulus is produced in the stretching direction in contrast to the compressing direction. Therefore, it is believed to be possible to form a cover layer having a balance of elasticity moduli with high anisotropy. Thus-formed cover layer enables the ball to recover rapidly from the deformation applied thereto when hit, to reduce the spin rate, and to enhance a ball distance.

In the present invention, from the above viewpoint, it has also been found that an increased ball distance and enhanced abrasion resistance are achieved when, defining the elasticity modulus in the stretching direction and the elasticity modulus in the compressing direction at the resin portion of the resin composition excluding the cation-treated phillosilicate as $\alpha_0$ and $\beta_0$ respectively, and the defining the elasticity modulus in the stretching direction and the elasticity modulus in the compressing direction at the resin composition containing the cation-treated phillosilicate as $\alpha_1$ and $\beta_1$ respectively, the balance between these elasticity moduli of the cover layer is set in such a manner that the value of $\alpha_1/\beta_1$ is 1.1 or more, and more preferably 1.2 or more, and the most preferably 1.3 or more with respect to the value of $\alpha_0/\beta_0$.

It is preferable that the elasticity modulus in the stretching direction is as high as possible, because the balance between the elasticity moduli in these directions has the increased tendency of anisotropy as the elasticity modulus in the stretching direction is higher. However, in order to offer an excellent compromise between the spin rate and the abrasion resistance, the balance is preferably 2.0 or less, and more preferably 1.8 or less, and the most preferably 1.6 or less.

The elasticity moduli are properly changeable in accordance with the kinds of the resin components to be used for the cover layer and the amount of the layered silica. When polyurethane is used as a base resin component, the elasticity modulus in the compressing direction of the resin portion of the resin composition is preferably 20 MPa or higher and 500 MPa or lower, and more preferably 30 MPa or higher and 400 MPa or lower, and the most preferably 50 MPa or higher and 350 MPa or lower.

Similarly, the elasticity modulus in the stretching direction of the resin portion of the resin composition is preferably 100 MPa or higher and 2500 MPa or lower, and more preferably 150 MPa or higher and 2000 MPa or lower, and the most preferably 180 MPa or higher and 1800 MPa or lower.

Each of the elasticity modulus of the cover layer can be obtained by producing a resin matrix having the same composition of the resin component used in the cover layer, if it is difficult to measure the elasticity modulus directly.

The elasticity modulus of the cover layer made of a resin composition containing the above-described polyurethane as a resin component and the cation-treated phillosilicate is preferably 30 MPa or higher and 600 MPa or lower in the compressing direction, and more preferably 40 MPa or higher and 500 MPa or lower, and the most preferably 55 MPa or higher and 400 MPa or lower. Similarly, the elasticity modulus in the stretching direction is preferably 150 MPa or higher and 3000 MPa or lower, and more preferably 200 MPa or higher and 2500 MPa or lower, and the most preferably 250 MPa or higher and 2300 MPa or lower.

The cover layer formed by use of the polyurethane preferably has a Shore D hardness of 55 or lower, and more preferably 52 or lower, and still preferably 50 or lower, in order to achieve a soft shot feeling. On the other hand, the cover layer preferably has a Shore D hardness of 20 or higher, and more preferably 25 or higher, and still more preferably 30 or higher, in order to increase the abrasion resistance.

Polyurethane to be used as a resin component of the resin composition for the cover layer is not specifically limited as far as it has a plurality of urethane bonds in its molecules. Examples of such polyurethane include a product in which polyisocyanate and polyol are reacted with each other to form urethane bonds in the molecules. Or alternatively, a product obtained from further reaction with polyamine, if necessary. Examples of such polyurethane include thermoplastic polyurethane and thermosetting (two-pack type) polyurethane.

The polyurethane generally contains a polyisocyanate component and a polyol component, and if necessary, further contains a polyamine component. The polyisocyanate component is not specifically limited as far as it has two or more isocyanate groups, and examples thereof include one selected from the group consisting of: aromatic polyisocyanates such as 2,4-toluenediisocyanate, 2,6-toluenediisocyanate, a mixture of 2,4-toluenediisocyanate and 2,6-toluenediisocyanate (TDI), 4,4'-diphenylmethanediisocyanate (MDI), 1,5-naphthylenediisocyanate (NDI), 3,3'-bitolylene-4,4'-diisocyanate (TODI), xylylenediisocyanate (XDI), tetramethylxylylenediisocyanate (TMXDI), p-phenylenediisocyanate (PPDI), and the like; alicyclic polyisocyanates or aliphatic polyisocyanates such as 4,4'-dicyclohexylmethanediisocyanate ($H_{12}$MDI), hydrogenated xylylenediisocyanage ($H_6$XDI), hexamethylenediisocyanate (HDI), isophoronediiusocyanate (IPDI), and the like; or a mixture of two or more of them.

From the viewpoint of enhancement in the abrasion resistance, it is preferable to use aromatic polyisocianates as a polyisocyanate component of the polyurethane. By use of aromatic polyisocyanates, the resultant polyurethane has enhanced mechanical property and a cover layer excellent in abrasion resistance is obtained. Further, from the viewpoint of enhancement in the weather resistance, it is preferable to use non-yellowing polyisocyanates (TMXDI, XDI, HDI, $H_6$XDI, IPDI, $H_{12}$MDI and the like) as a polyisocyanate component of the polyurethane, and more preferably 4,4'-dicyclohexylmethanediisocyanate ($H_{12}$MDI). Since 4,4'-dicyclohexylmethanediisocyanate ($H_{12}$MDI) has a rigid structure, the use thereof produces polyurethane with enhanced mechanical property, and as a result, a cover layer excellent in the abrasion resistance is obtained.

A polyol component that constitutes the polyurethane is not specifically limited as far as it has a plurality of hydroxyl groups, and examples thereof include low-molecule polyols and high-molecule polyols. Examples of low-molecule polyols include: diols such as ethylene glycol, diethylene glycol, triethylene glycol, 1,3-butanediol, 1,4-butanediol, neopentyl glycol, 1,6-hexanediol, and the like; and triols such as glycerin, trimethylol propane, hexanetriol, and the like. Examples of high-molecule polyols include: polyether polyols such as polyoxyethyleneglycol (PEG), polyoxypropyleneglycol (PPG), polyoxytetramethyleneglycol (PTMG), and the like; condensed polyester polyols such as polyethyleneadipate (PEA), polybutyleneadipate (PBA), polyhexamethyleneadipate (PHMA); lactone-based polyesterpolyols such as poly-$\epsilon$-caprolactone (PCL), and the like; polycarbonate polyols such as polyhexamethylenecarbonates, and the like; and acryl polyols, or alternatively a mixture of two or more of these polyols.

An average molecular weight of the high-molecule polyols is not specifically limited, and is preferably 400 or more, and more preferably 1000 or more. If the average molecular weight of the high-molecule polyols is too small, the resultant polyurethane is too much hard, resulting in bad shot feeling of the golf ball. The upper limit of the high-molecule weight polyols is not specifically limited, and is preferably 10000 or less, and more preferably 8000 or less.

Polyamine which constitutes the polyurethane if necessary is not specifically limited as far as it has at least two or more amino groups. Examples of the polyamine include: aliphatic polyamines such as ethylenediamine, propylenediamine, butylenediamine, hexamethylenediamine, and the like; alicyclic polyamines such as isophoronediamine, piperazine, and the like; and aromatic polyamines.

The aromatic polyamines are not specifically limited as far as they include at least two or more amino groups directly or indirectly bonded to aromatic rings. Here, an indirect bonding means that amino groups bonds to aromatic rings via lower alkylene groups, for example. The aromatic polyamines may be monocyclic aromatic polyamines in which two or more amino groups bonds to one aromatic ring, or may be polycyclic aromatic polyamines including two or more aminophenyl groups each in which at least one amino group bonds to one aromatic ring.

Examples of the monocyclic aromatic polyamines include: those in which amino groups directly bond to aromatic rings such as phenylenediamine, toluenediamine, diethyltoluenediamine, and dimethylthioltoluenediamine; and those in which amino groups bonds to aromatic rings via lower alkylene groups such as xylylenediamine. Further, the polycyclic aromatic polyamines may be poly(aminobenzene) in which at least two amino phenyl groups directly bonds to each other, or alternatively, at least two amino phenyl groups bonds to each other via lower alkylene groups or alkyleneoxide groups. Among them, preferable is diaminodiphenylalkane in which two amino phenyl groups bonds to each other via lower alkylene groups, and particularly preferable are 4,4'-diaminodiphenylmethane and its derivatives.

The thermoplastic polyurethane and thermosetting polyurethane (two-pack type polyurethane) which may be used as a resin component of the resin composition for the cover layer can be prepared by properly combining the polyisocyanates, polyols, and polyamines with each other. Examples of the method for synthesizing the polyurethane include a one-shot method and a prepolymer method. The one-shot method is a method in which polyisocyanates and polyols are reacted with each other at one time. The prepolymer method is a method in which polyisocyanates and polyols are reacted with each other in plural steps, and for example, low-molecule urethane prepolymers are tentatively synthesized and then, the synthesized urethane prepolymers are subsequently turned to be high-molecule urethane prepolymers.

Thermoplastic polyurethane is generally polyurethane which is turned into high molecules to some extent by the above-described synthesizing method. Low-molecule urethane prepolymer is tentatively kept, and a chain extending agent (or a curing agent) is added thereto at the time of forming the cover layer by molding so as to turn the low-molecule urethane prepolymer into high molecules, thereby producing thermosetting polyurethane (two-pack type polyurethane). In synthesizing polyurethane, a known catalyst may be used. Examples of the catalyst include: monoamines such as triethylamine, N,N-dimethylcyclohexylamine, and the like; polyamines such as N, N,N',N'-tetramethylethylenediamine, N, N, N',N",N"-pentamethyldiethylenetriamine, and the like; cyclic diamines such as 1,8-diazabicyclo-[5,4,0]-7-undecene(DBU), triethylenediamine; tin-based catalysts such as dibutyltindilaurylate, dibutyltindiacetate, and the like.

In the present invention, it is preferable to use thermoplastic polyurethane, and thermosetting polyurethane elastomer is more preferable as a resin component of the resin composition for a cover layer. The thermoplastic polyurethane elastomer is polyurethane which exhibits so-called rubber elasticity. The employment of the thermoplastic polyurethane elastomer provides a cover layer with high resilience. The thermoplastic polyurethane elastomer is not specifically limited as far as it can be molded into a cover layer by an injection molding or a compression molding, and "Elastolan XNY90A", "Elastolan XNY97A", "Elastolan XNY585" and the like commercially available from BASF Polyurethane Elastomers Co., Ltd. may be used.

The thermoplastic polyurethane and the thermoplastic polyurethane elastomer are not specifically limited, and examples thereof include: those containing a polyisocyanate component and a high-molecule polyol component as components; those containing a polyisocyanate component, a high-molecule polyol component, and a low-molecule polyol component as components; those containing a polyisocyanate component, a high-molecule polyol component, a low-molecule polyol component, and a polyamine component as components; those containing a polyisocyanate component, a high-molecule polyol component, and a polyamine component as components, and the like.

In the present invention, it is also preferable to use thermosetting polyurethane as a resin component of the resin composition for a cover layer. Since thermosetting polyurethane is capable of creating a large amount of three-dimensional cross-linked points, it provides a cover layer with excellent durability. An example of such thermosetting polyurethane includes, for example, that cures urethane polymer having an isocyanate group as a terminal by a curing agent such as polyamine and polyol. An alternative example thereof includes that cures urethane prepolymer having a hydroxyl group or an amino group as a terminal by a curing agent such as polyisocyanate. Polyamine, polyol or polyisocyanate to be used as a curing agent may be properly selected among those described above.

Among them, preferable is thermosetting polyurethane which is obtained by curing urethane prepolymer having an isocyanate group as a terminal by polyamine. In this case, it is desirable to set the molar ratio of the amino groups in the curing agent with respect to the isocyanate groups in urethane prepolymer ($NH_2$/NCO) to 0.70 more higher, and more preferably 0.80 or higher, and still more preferably 0.85 or higher, and to 1.20 or lower, and more preferably 1.05 or lower, and still preferably 1.00 or lower. At the molar ratio of less than 0.70, the amount of urethane prepolymer having an isocyanate group as a terminal with respect to polyamine is excessive, thus the allophanate or biruet cross-linking reaction tends to generate excessively. As a result, the finally obtained polyurethane tends to have poor flexibility. On the other hand, at the molar ratio of higher than 1.20, the amount of isocyanate groups is short, thus allophanate or biruet cross-linking reaction is hard to occur. As a result, the number of the three-dimensional cross-linked points becomes too small and the finally obtained thermosetting polyurethane tends to have low strength.

In the present invention, it is also preferable to use ionomer resin as a resin component of the resin composition for a cover layer. Examples of the ionomer resin include: that obtained by neutralizing at least a part of carboxyl groups in a binary copolymer of ethylene and α, β-unsaturated carboxylic acid with a metal ion; and that obtained by neutralizing at least a part of carboxyl groups in a ternary copolymer of ethylene, α, β-unsaturated carboxylic acid, and α, β-unsaturated carboxylic ester with a metal ion. Preferable examples of the α, β-unsaturated carboxylic acid include: acrylic acid, methacrylic acid, fumaric acid, maleic acid, crotonic acid, and the like, and especially preferable is acrylic acid or methacrylic acid. Examples of α, β-unsaturated carboxylic ester include methyl, ethyl, propyl, n-butyl, isobutyl ester of acrylic acid, methacrylic acid, fumaric acid, maleic acid, and the like, and especially preferable is acryl ester or methacylate ester. Examples of the metal ion which neutralizes at least a part of carboxyl groups in the binary copolymer of ethylene and α, β-unsaturated carboxylic acid or in the ternary copolymer of ethylene, α, β-unsaturated carboxylic acid, and α, β-unsaturated carboxylic ester include: alkaline metal ions such as sodium, potassium, and lithium; bivalent metal ions such as magnesium, calcium, zinc, barium, and cadmium; trivalent metal ions such as aluminum; and other ions such as zirconium. Among them, sodium, zinc, and magnesium ions are especially preferably used because they achieve high resilience and durability.

Specific examples of the ionomer resin include: Himilan 1555, 1557, 1605, 1652, 1702, 1705, 1706, 1707, 1855, 1856 (manufactured by Dupont-Mitsui Chemical Co.); Surlyn 8945, Surlyn 9945, Surlyn 6320 (manufactured by Dupont Co.); and IOTEK 7010, 8000 (manufactured by Exxon Co.). These inomer resins may be used alone or may be used as a mixture in combination of two or more of them.

In the present invention, it is preferable to additionally use thermoplastic elastomer, diene-based block copolymer, or the like in addition to the base material resin such as the thermoplastic polyurethane or the ionomer resin as a resin component of the resin composition for a cover layer. Specific examples of the thermoplastic elastomer include: thermoplastic polyamide elastomer commercially available from Toray Industries Inc. under the trade name of "Pebax" (for example, "Pebax 2533"); thermoplastic polyester elastomer commercially available from Dupont-Toray Co. under the trade name of "Hytrel" (for example, "Hytrel 3548" and "Hytrel 4047"); thermoplastic polyurethane elastomer commercially available from BASF Polyurethane Elastomers Co. under the trade name of "Elastolan" (for example, Elastolan ET880); thermoplastic styrene-based elastomer commercially available from Mitsubishi Chemical Corporation under the trade name of "Rabalon" (for example, "Rabalon SR04" and "Rabalon T3339C"), and the like.

The diene-based block copolymer has double-bonds derived from a conjugated diene compound of a block copolymer or a partially hydrogenated block copolymer. The block copolymer to be a base thereof is a block copolymer including a polymer block A containing at least one vinyl aromatic compound as a main component and a polymer block B containing at least one conjugated diene compound as a main component. The partially hydrogenated block copolymer is obtained by hydrogenating the block copolymer described above. As the vinyl aromatic compound which constitutes the block copolymer, one or two or more may be selected from the group consisting of styrene, α-methylstyrene, vinyltoluene, p-t-butylstyrene, 1,1-diphenylstyrene, and the like, and among them, styrene is preferable. As the conjugated diene compound, one or two or more may be selected from the group consisting of butadiene, isoprene, 1,3-pentadiene, 2,3-dimetyl-1,3-butadiene, and the like, and among them, butadiene, isoprene, and a combination thereof are preferable. Examples of preferable diene-based block copolymer include a block copolymer having a styrene-butadiene-styrene (SBS) structure having a polybutadiene block containing epoxy groups, and a block copolymer having a styrene-isoprene-styrene (SIS) structure containing epoxy groups.

Specific examples of the diene-based block copolymer include: "Epofriend A1010" manufactured by Daicel Chemical Industries, Co., Ltd.; and "Septon HG-252" manufactured by Kuraray Co., Ltd. The blending amount of the thermoplastic elastomer or the diene-based block copolymer is preferably 1 to 60 parts by mass, and more preferably 1 to 35 parts by mass with respect to 100 parts by mass of the base material resin.

In addition to the resin components and the cation-treated phillosilicate described above, the resin composition for a cover layer of the present invention may contain: pigment components such as zinc oxide, titanium oxide, and blue pigment; specific gravity adjusters such as calcium carbonate and barium sulfate; dispersants; antioxidants; UV absorbers; light stabilizers; fluorescent materials; fluorescent brighters; or the like, to the extent that they do not impair the performance of the cover layer.

The golf ball of the present invention is not limited to a specific structure as far as it includes a core and an outer layer surrounding the core, and examples thereof include: a two-piece golf ball including a (single-layered) core and a cover layer for covering the core; a multi-piece golf ball including a center, at least a layer of intermediate layer for covering the center (core), and a cover layer for covering the intermediate layer; and a thread-wound golf ball including a thread-wound core and a cover layer for covering the thread-wound core. Among them, a two-piece golf ball and a multi-piece golf ball are preferable.

Hereinafter, a method for manufacturing a golf ball including the cover layer will be described based on a two-piece golf ball. It should be noted that the present invention is not limited to this manufacturing method. As a core of a two-piece golf ball, any conventionally known core may be used, and for example, a preferable core is obtained by hot-press molding a rubber composition for a core containing base rubber, co-crosslinking agent, organic peroxide, and a filler.

As the base rubber, natural rubber and/or synthetic rubber may be used, and for example, polybutadiene rubber, natural rubber, polyisoprene rubber, styrene-polybutadiene rubber, ethylene-propylene-diene rubber (EPDM) may be used. Among them, it is preferable to use high-cis content polybutadiene rubber including 40% or more, and preferably 70% or more, and more preferably 90% or more cis bonds, as it provides a golf ball advantageous in resilience.

As the co-crosslinking agent, α, β-unsaturated carboxylic acid or its metallic salt having a carbon number of 3 to 8 may be used, and examples thereof include acrylic acid, methacrylic acid or metallic salts thereof. Examples of the metals constituting the metallic salts include zinc, magnesium, calcium, aluminum, sodium, and it is preferable to use zinc because the resilience is increased. It is desirable that the use amount of the co-crosslinking agent is 10 parts by mass or more, and more preferably 20 mass percent or more, and 50 parts by mass or less, and more preferably 40 parts by mass or less with respect to 100 parts by mass of the base material rubber. If the use amount of the co-crosslinking agent is less than 10 parts by mass, it is required to increase the use amount of organic peroxide in order to achieve proper hardness; however, in this case, the resilience tends to be low. On the other hand, if the use amount of the co-crosslinking agent exceeds 50 parts by mass, the core becomes too hard, and deteriorating the shot feeling becomes bad.

Examples of the organic peroxide contained in the rubber composition for a core includes organic peroxides such as dicumyl peroxide, 1,1-bis(t-butylperoxi)-3,5-trimethylcyclohexane, 2,5-dimethyl-2,5-di(t-butylperoxy)hexane, and di-t-butylperoxide. Among them, dicumyl peroxide is preferably used. The amount of the organic peroxide is preferably 0.2 to 3 parts by mass, and more preferably 0.3 to 2 parts by mass with respect to 100 parts by mass of the base material rubber. If the amount is less than 0.2 parts by mass, the resultant core is too soft, and in this case, the resilience tends to be low. Contrarily, if the amount exceeds 3 parts by mass, it is required to increase the amount of the co-crosslinking agent in order to achieve a proper hardness, leading to decrease the resilience.

Examples of the filler to be contained in the rubber composition for a core include inorganic fillers such as zinc oxide, barium sulfate, calcium carbonate, magnesium oxide, tungsten powder, and molybdenum powder. It is desirable that the amount of the filler is 2 parts by mass or more, and more preferably 3 parts by mass or more, and 50 parts by mass or less, and more preferably 35 parts by mass or less with respect to 100 parts by mass of the base material rubber. If the amount of the filler is less than 2 parts by mass, it is hard to adjust the weight of the core. Contrarily, if the blending amount exceeds 50 parts by mass, the weight proportion of the rubber component becomes small, and in this case, the resilience tends to be low.

The rubber composition for a core may be further blended with an organic sulfur compound, antioxidant, peptizing agent, or the like properly in addition to the base rubber, co-crosslinking agent, organic peroxide, and filler. The amount of the antioxidant is preferably 0.1 parts by mass or more and 1 part by mass or less with respect to 100 parts by mass of the base rubber. The amount of the peptizing agent is preferably 0.1 parts by mass or more and 5 parts by mass or less with respect to 100 parts by mass of the base rubber.

The conditions of hot-press molding the rubber composition for a cure may be properly set in accordance with the rubber composition. Normally, it is preferable that the rubber composition is heated at 130 to 200° C. for 10 to 60 minutes, or alternatively, the rubber composition is heated in two steps where it is heated at 130 to 150° C. for 20 to 40 minutes, and then, it is heated at 160 to 180° C. for 5 to 15 minutes.

In the present invention, the core molded as described above is covered with the cover layer described above to produce a golf ball body. When thermosetting polyurethane is used as a resin component of the resin composition for a cover layer, the following steps are carried out, for example. First, the cover may be formed by injecting a cover composition into the hemispherical mold wherein a core to be covered is placed, and then inverting the mold, connecting the mold to another hemispherical mold into which the cover composition is also injected, and carrying out a curing reaction. The curing reaction of the resin composition for a cover layer containing the thermosetting polyurethane is desirably carried out at 30 to 120° C., and preferably 50 to 80° C. for 2 to 60 minutes, and preferably 5 to 30 minutes.

If thermoplastic polyurethane, ionomer resin, thermoplastic elastomer or the like is used as the resin component of the resin composition for a cover layer, the following methods are employed, for example. In one method, the resin composition for a cover layer is formed into a half shell having a hemispherical shape beforehand, and a core is wrapped with two pieces of thus-formed half shells and the resultant is molded under pressure at 110 to 170° C. for 1 to 10 minutes. In another method, the resin composition for a cover layer is injection-molded in such a manner that it covers a core.

The thickness of the cover layer of the golf ball of the present invention is not specifically limited, and preferably 0.3 to 2.5 mm, and more preferably 0.3 to 2.0 mm, and further preferably 0.5 to 0.9 mm. When a golf ball body is produced by forming the cover layer, normally, dents called as dimples are formed over the surface. The surface of the golf ball body may be further subjected with a polishing treatment such as sand blasting. It is also preferable that the golf ball of the present invention is usually paint-coated or mark-stamped before being brought to the market, for the purposes of improving the aesthetic appearance and thus increasing the commercial value thereof.

Although the above description of the production method has been made as to a two-piece golf ball, a thread-wound core may be used for a thread-wound golf ball, for example. In the case of a multi-piece golf ball of three or more pieces, at least one or more of intermediate layers may be formed between the core and the cover layer.

The thread-wound core includes a center, and a thread rubber layer formed by winding thread rubber around the center, and the core of conventionally known type may be used. The center may be either of a liquid-based type (a liquid center) or of a rubber-based type (a solid center). The thread rubber to be wound around the center may be of the same type as those conventionally used in the thread wound layer of a thread wound golf ball, and for example, it is possible to use a thread rubber obtained by vulcanizing natural rubber or a rubber composition prepared by blending natural rubber and synthetic polyisoprene with sulfur, a vulcanization assistant, a vulcanization accelerator, an antioxidant, and the like. The thread-wound core is prepared by winding a rubber thread around the center while stretching the rubber thread about 10 times relative to its original length.

As an intermediate layer constituting an outer layer of the multi-piece golf ball of three or more pieces, the same resin component as of the resin component contained in the cover layer may be used. For example, thermoplastic elastomers such as thermoplastic polyurethane, ionomer resin, thermoplastic polyamide elastomer, thermoplastic polyester elastomer, and thermoplastic polyurethane elastomer, and diene-based block copolymer may be used. It is preferable that the resin composition containing the cation-treated phillosilicate of the present invention is also used for the intermediate layer.

The method for forming the intermediate layer is not specifically limited, and the following methods may be employed, for example. In one method, the material for forming the intermediate layer is formed into a half shell having a hemispherical shape beforehand and a solid center is wrapped with two pieces of thus-formed half shells, and the resultant is molded under pressure. In another method, the material for the intermediate layer is directly injection molded over the solid center so as to wrap the solid center.

EXAMPLES

Hereinafter, the present invention will be further described in detail by way of examples. It should be noted that the present invention is not limited to the following examples, and all modifications and embodiments are included within the scope of the present invention as far as they do not depart from the gist of the present invention. In the examples, the use amount of each composition is in unit of "parts by mass."

[Hardness]
A hot press molded sheet having a thickness of 2 mm produced from each resin composition was kept at 23° C. for two weeks. Three or more pieces of thus-produced sheets were stacked one another and the hardness of the resultant was measured by a spring type hardness tester D stipulated in ASTM-D2240 and an automatic rubber hardness tester LA1 manufactured by Kobunshi Tester Co.

[Elasticity Modulus]
A dynamic viscoelasticity spectrometer Rheogel-E4000 manufactured by UBM Co., was used as a measuring device. A sample piece of 4 mm in width, 30 mm in length, and 0.5 mm in thickness prepared from each resin composition of Table 2 was used. The measurement was conducted in a condition where the length of deformed site was determined as 20 mm, and the distribution in the temperatures ranging from −100 to 100° C. (at a temperature raising rate of 2° C./min) was measured at an initial loading of 50 g, an amplitude of 0.025% and frequency of 10 Hz, and the storage elasticity modulus (E') at −50° C. was read and thus-read value was determined as an elasticity modulus in a stretching direction.

A sample piece of 4 mm in width, 4 mmm in length, and 0.5 mm in thickness was prepared from each resin composition of Table 2. By use of the same measuring device as described above, the distribution in the temperatures ranging from −100 to 100° C. (at a temperature raising rate of 2° C./min) was measured at an initial loading of 600 g, an amplitude of 0.5% and frequency of 10 Hz, and the storage elasticity modulus (E') at −50° C. was read and thus-read value was determined as an elasticity modulus in a compressing direction.

A ratio between the elasticity modulus in the compressing direction and the elasticity modulus in the stretching direction $[(\alpha_1/\beta_1)/(\alpha_0/\beta_0)]$ caused by the presence or absence of the reinforcing material was obtained from the comparison between the resin composition containing the reinforcing material and the resin and the resin composition made of the same resin composition alone.

[Flight Performance]

(1) Launch Angle
A W#1 driver with a metal head was mounted to a swing robot manufactured by True Temper Co. Hitting was carried out at a head speed of 45 m/sec. and the launch angle immediately after hitting was measured. The measurement was carried out five times and an average value was obtained.

(2) Spin Rate
A W#1 driver with a metal head was mounted to a swing robot manufactured by True Temper Co. Hitting was carried out at a head speed of 45 m/sec. and the back spin rate immediately after hitting was measured. The measurement was carried out five times and an average value was obtained.

(3) Ball Distance

A W#1 driver with a metal head was mounted to a swing robot manufactured by True Temper Co. Hitting was carried out at a head speed of 45 m/sec. and the ball distance (m) was measured. The measurement was carried out five times and an average value was obtained.

[Abrasion Resistance]

A commercially available pitching wedge was mounted to a swing robot machine, and a ball was hit at its two portions at a head speed of 36 m/sec. The hit portions were visually observed and evaluated based on the following standard classified into three grades:

○: No scuffing although scratches may be left on the ball surface in some cases;

Δ: Some scuffing was observed with clear scratches left on the ball surface; and X: Significant scuffing was observed with a deep scratch left on the ball surface.

[Shot Feeling]

The impact strength or the sensation of repulsion imparted by a golf ball upon shot was evaluated according to the following rating criteria by an actual hitting test conducted by ten golfers using a metal head driver W#1. A rating category to which the largest number of golfers agreed for each golf ball was determined as the shot feeling of the golf ball.:

○: Good with small impact;

Δ: Normal; and

X: Bad with large impact.

[Production of Golf Ball]

(1) Production of Core

A rubber composition for a core having a blending ratio shown in Table 1 was mixed, and the resultant was hot pressed in upper and lower dies each having a hemispherical shape at 170° C. for 15 minutes so as to obtain a spherical core.

TABLE 1

| Rubber composition for core | (Parts by mass) |
|---|---|
| Poly butadiene rubber | 100 |
| Zinc acrylate | 33 |
| Zinc oxide | 12 |
| Diphenyldisulfide | 0.5 |
| Dicumylperoxide | 1 |
| Diameter (mm) | 41.2 |
| Deformation amount of core | 3.0 |

Polybutadiene rubber: BR18 manufactured by JSR (cis content: 96% or more)
Zinc acrylate: ZNDA-90S manufactured by Nihon Jyoryu Co.
Zinc oxide: Ginrei R manufactured by Toho-Zinc Co.
Diphenyldisulfide: manufactured by Sumitomo Seika Chemicals Co.
Dicumylperoxide: Percumyl D manufactured by NOF Co.

(2) Production of Rubber Composition for Outer Layer (Production of Half Shelf)

The materials shown in Table 2 were mixed with each other in a double-shaft mixing type extruder so as to produce a pellet. The extrusion was conducted under the conditions where the screw diameter was 45 mm, the screw rotation speed was 200 rpm, and the screw L/D was 35, and the blended substance was heated at 230° C. at a position of the die of the extruder. A half shell of 0.9 mm in thickness made of a resin composition for a cover layer was produced from the obtained pellet.

(3) Production of Outer Layer

Obtained two pieces of half shells each made of the resin composition were attached to each other. Then, the half shells were molded by heating under pressure at 120 to 130° C. onto the core obtained in the manner as described above so as to be press-molded to form a cover layer, and then, the cover layer was painted. As a result, a two-piece golf ball having a cover layer of 0.8 mm in thickness was produced.

TABLE 2

| | Resin composition No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Elastolan XNY585 | 100 | 100 | 100 | — | — | — | 100 | — | 100 | — | — | — | — | 100 | — |
| Elastolan XNY97A | — | — | — | 80 | 80 | 80 | — | 70 | — | 80 | 80 | 80 | — | — | 70 |
| Pebax 5533SN00 | — | — | — | 20 | 20 | 20 | — | 30 | — | 20 | 20 | 20 | — | — | 30 |
| Himilan 1555 | — | — | — | — | — | — | — | — | — | — | — | — | 50 | — | — |
| Himilan 1557 | — | — | — | — | — | — | — | — | — | — | — | — | 50 | — | — |
| Dellite 67G | — | — | — | 5 | — | — | — | 5 | — | — | — | — | — | — | — |
| Dellite 43B | 5 | 10 | 20 | — | 5 | — | 35 | — | — | — | — | — | — | — | — |
| Dellite HPS | — | — | — | — | — | 5 | — | — | — | — | — | — | — | — | — |
| Aluminum borate whisker | — | — | — | — | — | — | — | — | — | — | 5 | 35 | — | — | — |
| M1030D | — | — | — | — | — | — | — | — | — | — | — | — | — | 20 | — |
| Hardness | 35 | 37 | 40 | 48 | 48 | 47 | 43 | 51 | 35 | 47 | 47 | 50 | 59 | 40 | 50 |
| Elasticity modulus in stretching direction (MPa) | 260 | 300 | 360 | 2200 | 2250 | 2000 | 460 | 2500 | 180 | 1600 | 1800 | 2000 | 1800 | 250 | 1900 |
| Elasticity modulus in compressing direction (MPa) | 55 | 60 | 70 | 340 | 335 | 340 | 100 | 350 | 50 | 320 | 340 | 370 | 400 | 65 | 330 |

TABLE 2-continued

| | Resin composition No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| $(\alpha_1/\beta_1)/(\alpha_0/\beta_0)$ | 1.31 | 1.39 | 1.43 | 1.29 | 1.34 | 1.18 | 1.28 | 1.24 | — | — | 1.06 | 1.08 | — | 1.07 | — |

Elastolan XNY585: Thermoplastic polyurethane elastomer manufactured by BSAF Japan Ltd.
Elastolan XNY97A: Thermoplastic polyurethane elastomer manufactured by BSAF Japan Ltd.
Pebax 5533NOO: Thermoplastic polyamide elastomer manufactured by Elf Atofina Japan Co., Ltd.
Himilan 1555: Ionomer manufactured by Dupont-Mitsui Polychemical Co., Ltd.
Himilan 1557: Ionomer manufactured by Dupont-Mitsui Polychemical Co., Ltd.
Dellite 67G: Bentonite clay manufactured by Laviosa Co.
Dellite 43B: Bentonite clay manufactured by Laviosa Co.
Dellite HPS: Bentonite clay manufactured by Laviosa Co.
Aluminum borate whisker: Alborex YS3A manufactured by Shikoku Chemicals Co. (fibrous reinforcing material surface-treated with aminosilane, length: 20 μm, diameter: 1.0 μm)
M1030D: Nanocomposite manufactured by Unitika Ltd. (phillosilicate without cation treatment)

As is obvious from Table 2, all of the resin compositions Nos. 1 to 8 of the present invention have hardness at the same level as of the case of using a resin alone. It is understood that although these resin compositions contain the cation-treated phillosilicate, they are capable of forming a relatively soft cover layer without impairing the property of polyurethane. In addition, the resin compositions Nos. 1 to 8 have elasticity moduli higher than those of the compositions each containing a resin alone. In comparison of the balance between the elasticity modulus in the compressing direction and the elasticity modulus in the stretching direction, an increase in the stretching direction is larger than the case of using a resin alone. In particular, it is understood that the resin compositions containing the cation-treated phillosilicate treated with quaternary ammonium salt respectively exhibit the balance exceeding 1.2 and are capable of providing a cover layer with high anisotropy.

Contrary to the above, the resin compositions Nos. 11 and 12 containing aluminum borate whisker which is a conventional reinforcing material respectively exhibit high elasticity modulus in the compressing direction and high elasticity modulus in the stretching direction. However, the resin compositions Nos. 11 and 12 respectively exhibit the balance between the elasticity modulus in the compressing direction and the elasticity modulus in the stretching direction at the same level as of the case using a resin alone, and these elasticity moduli merely increase isotropically. In addition, since the resin composition No. 13 contains ionomer with high hardness in order to increase the elasticity moduli by use of a resin alone, the hardness increases to be very high and it is hard to obtain a soft cover layer.

Next, evaluations of two-piece golf balls manufactured by use of the resin compositions described above are shown in Table 3.

TABLE 3

| | | Examples | | | | | | |
|---|---|---|---|---|---|---|---|---|
| Ball No. | | a | b | c | d | e | f | g |
| Cover layer resin composition No. | | 1 | 3 | 4 | 5 | 6 | 7 | 8 |
| Flight performance | Launch angle (°) | 11.0 | 11.2 | 11.2 | 11.2 | 11.1 | 11.4 | 11.4 |
| | Spin rate (rpm) | 2900 | 2870 | 2830 | 2810 | 2880 | 2820 | 2800 |
| | Ball distance (m) | 227 | 228 | 230 | 230 | 229 | 230 | 231 |
| Abrasion resistance | | ○ | ○ | ○ | ○ | ○ | Δ | ○ |
| Shot feeling | | ○ | ○ | ○ | ○ | ○ | ○ | ○ |

| | | Comparative Examples | | | | | |
|---|---|---|---|---|---|---|---|
| Ball No. | | h | i | j | k | l | m | n |
| Cover layer resin composition No. | | 9 | 10 | 11 | 12 | 13 | 14 | 15 |
| Flight performance | Launch angle (°) | 10.6 | 10.9 | 10.9 | 11.0 | 11.6 | 10.9 | 11.0 |
| | Spin rate (rpm) | 3200 | 2920 | 2900 | 2750 | 2600 | 2990 | 2890 |
| | Ball distance (m) | 222 | 225 | 224 | 228 | 232 | 224 | 226 |
| Abrasion resistance | | Δ | Δ | X | X | X | X | Δ |
| Shot feeling | | ○ | ○ | ○ | X | X | ○ | ○ |

As is shown in Table 3, the golf balls Nos. a to g exhibit examples each of which has a cover layer formed of a resin composition containing the cation-treated phillosilicate. It is understood that these golf balls exhibit high launch angles, low spin rates, and long ball distances, as compared with the golf balls each having a cover layer made of an identical resin alone. Further, they have enhanced abrasion resistances while soft shot feelings are obtained by using polyurethane as a base resin for the cover layer.

As mentioned above, according to an aspect of the present invention, it is preferable that the resin composition contains 1 part by mass or more and 30 parts by mass or less of the cation-treated phillosilicate with respect to 100 parts by mass of the resin.

According to another aspect of the invention, it is preferable that a cation of the cation-treated phillosilicate is at least one selected from the group consisting of alkali metals, alkali earth metals, and quaternary ammonium salt, and the use of quaternary ammonium salt is especially preferable. Further, it is preferable that at least one substituent group of the quaternary ammonium salt is an aromatic hydrocarbon group or carboxyl group.

According to further another aspect of the invention, when it is intended to produce a soft golf ball, it is preferable to use polyurethane as the resin for the resin composition.

Further, the present invention clearly exhibits its effect by use of the above-described resin composition for the cover layer.

In the case of using the above-described resin composition for the cover layer of the golf ball, in order to achieve proper elasticity modulus in a compressing direction and elasticity modulus in a stretching direction, defining an elasticity modulus in a stretching direction and an elasticity modulus in a compressing direction at a resin portion of the resin composition excluding the cation-treated phillosilicate as $\alpha_0$ and $\beta_0$ respectively, and an elasticity modulus in a stretching direction and an elasticity modulus in a compressing direction at the resin composition containing the cation-treated phillosilicate as $\alpha_1$ and $\beta_1$ respectively, it is preferable that the value of $(\alpha_1/\beta_1)/(\alpha_0/\beta_0)$ is 1.1 or higher.

In the present invention, since the cation-treated phillosilicate is used as a reinforcing material, the dispersibility of the cation-treated phillosilicate into a resin is improved, while the phillosilicate is in the form of fine particles having a thickness of nano level and is by nature hydrophilic. The improvement in the dispersibility enables the cation-treated phillosilicate to be present in the state of a primary particle in the form of single leaf in the resin matrix, so that the cation-treated phillosilicate exhibits sufficient effect as a reinforcing material. Due to the features of the cation-treated phillosilicate dispersed in the form of single leaf, a cover layer made of a resin composition containing the cation-treated phillosilicate exhibits an increasing amount in the elasticity modulus in a stretching direction larger than an increasing amount in the elasticity modulus in a compressing direction, as compared with a resin composition composed of a resin alone. As a result, the golf ball promptly recovers from the deformation when hit, and provides an improved ball distance. In particular, when a cover layer is made of a resin composition containing polyurethane as a resin component, a golf ball having excellent abrasion resistance is obtained while having a soft cover layer to provide soft shot feeling.

In the present invention, although the cation-treated phillosilicate is in the form of fine particles having a thickness of nano level, it is excellent in dispersibility into a resin. Therefore, an effect of the cation-treated phillosilicate can be sufficiently obtained even if it is added in a small amount ranging from 1 part by mass or more up to 30 parts by mass or less with respect to 100 parts by mass of resin.

As a cation of the cation-treated phillosilicate, it is preferable to use at least one selected from the group consisting of alkali metals, alkali earth metals, and quaternary ammonium salt, because such a cation achieves good dispersion into a resin. Further, it is preferable that the quaternary ammonium salt has substituent groups at least one of which is substituted with an aromatic hydrocarbon group or a carboxylic group. By use of such a quaternary ammonium salt, the polarity of the cation-treated phillosilicate can be fully changed. An untreated phillosilicate is difficult to be dispersed into a resin having high polarity of hydrophobic property because such untreated phillosilicate has high hydrophilic property. However, in the present invention, dispersion of the cation-treated phillosilicate even into such a resin having high polarity, for example, into polyurethane, is enabled.

This application is based on Japanese Patent Application No. 2004-203931 filed on Jul. 9, 2004 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A golf ball comprising a core and an outer layer for covering said core, wherein said outer layer is formed of a resin composition containing a cation-treated phillosilicate, and wherein a cation of said cation-treated phillosilicate is quaternary ammonium salt, wherein said resin composition contains 1 part by mass or more and 30 parts by mass or less of said cation-treated phillosilicate with respect to 100 parts by mass of a resin.

2. A golf ball according to claim 1, wherein at least one substituent group of said quaternary ammonium salt is an aromatic hydrocarbon group or carboxyl group.

3. A golf ball according to claim 1, wherein said resin composition contains polyurethane.

4. A golf ball according to claim 1, wherein said outer layer is a cover layer.

5. A golf ball according to claim 4, wherein, defining an elasticity modulus in a stretching direction and an elasticity modulus in a compressing direction at a resin portion of said resin composition excluding the cation-treated phillosilicate as $\alpha_0$ and $\beta_0$ respectively, and an elasticity modulus in a stretching direction and an elasticity modulus in a compressing direction at said resin composition containing the cation-treated phillosilicate as $\alpha_1$ and $\beta_1$ respectively, the value of $(\alpha_1/\beta_1)/(\alpha_0/\beta_0)$ is 1.1 or higher.

6. A golf ball comprising a core and an outer layer covering the core, wherein
the outer layer is formed of a resin composition comprising a cation-treated phillosilicate and a base resin component; wherein
the cation of said cation-treated phillosilicate is quaternary ammonium salt; and wherein
the quaternary ammonium salt has at least one substituent group selected from the group consisting of an aromatic hydrocarbon group and a carboxylic group.

7. A golf ball according to claim 6, wherein the quaternary ammonium salt has an aromatic hydrocarbon substituent group and a carboxylic substituent group.

8. A golf ball according to claim 6, wherein the phillosilicate is in the form of nano sized particles of which primary particles have, a thickness of 50 nm or less.

9. A golf ball according to claim 8, wherein the nano sized particles are shaped like a flat plate and have a width and a length of 1 μm or less.

10. A golf ball according to claim 7, wherein the aromatic hydrocarbon substituent group comprises one of benzyl group, phenethyl group, tolyl group, xylyl group, diphenylmethyl group and trityl group.

11. A golf ball according to claim 10, wherein the carboxylic substituent group comprises one of carboxylate group, myristate group, palmitate group oleate group and laurate group.

12. A golf ball according to claim 11, wherein the phillosilicate is cation-treated before being mixed with the resin composition.

13. A golf ball according to claim 12, wherein the base resin component of the resin composition comprises at least one of polyurethane, ionomer resin, polyamide, polyester polyolefin and polystyrene-based elastomers.

14. A golf ball according to claim 13, wherein the base resin component of the resin composition consists essentially of polyurethane.

15. A golf ball according to claim 13, wherein the base resin component of the resin composition consists essentially of ionomer resin.

16. A golf ball according to claim 13, wherein the cation-treated phillosilicate is in the form of single leaf.

17. A golf ball according to claim 13, further comprising at least one of a thermoplastic elastomer and a diene-based block copolymer in addition to the base resin component of the resin composition.

18. A golf ball according to claim 17, wherein the resin composition further comprises at least one of gravity adjusters, disperants, antioxidants, UV absorbers, light stabilizers, fluorescent materials fluorescent brighters and pigments.

* * * * *